United States Patent [19]

Fujimoto et al.

[11] Patent Number: 5,670,275
[45] Date of Patent: Sep. 23, 1997

[54] ION CONDUCTIVE MATERIAL FOR SECONDARY BATTERY

[75] Inventors: Masahisa Fujimoto; Koji Nishio; Toshihiko Saitoh, all of Osaka, Japan

[73] Assignee: Sanyo Electric Co., Ltd., Osaka, Japan

[21] Appl. No.: 733,529

[22] Filed: Oct. 18, 1996

Related U.S. Application Data

[60] Division of Ser. No. 466,197, Jun. 6, 1995, Pat. No. 5,601,949, which is a continuation-in-part of Ser. No. 134,079, Oct. 8, 1993, abandoned.

[30] Foreign Application Priority Data

Nov. 19, 1992 [JP] Japan ........................ 4-335660

[51] Int. Cl.⁶ ........................................... H01M 4/48
[52] U.S. Cl. ........................................ 429/218; 429/194
[58] Field of Search ............................ 429/218, 194

[56] References Cited

U.S. PATENT DOCUMENTS

| | | | |
|---|---|---|---|
| 4,388,227 | 6/1983 | Kalnin | 252/510 |
| 4,931,240 | 6/1990 | Tajima et al. | 264/81 |
| 5,601,949 | 2/1997 | Fujimoto et al. | 429/218 |

*Primary Examiner*—Prince Willis, Jr.
*Assistant Examiner*—Carol Chaney
*Attorney, Agent, or Firm*—Loeb & Loeb LLP

[57] ABSTRACT

A secondary battery is comprised of a positive electrode having a material intercalating alkali earth metal ions or lanthanoid metal ions reversibly, a negative electrode having a carbon composition intercalating those ions reversibly and an electrolyte having an organic solvent and a solute. The solute includes an alkali earth metal salt or a lanthanoid metal salt. The organic solvent is selected from a group comprising ethylene carbonate (EC), dimethyl carbonate (DMC) and vinylene carbonate (VC). The carbon composition is selected from a group comprising coke, refined coke with 99% or more purity, organic compound produced by calcined cellulose, graphite and glassy carbon.

4 Claims, 9 Drawing Sheets

ION CONDUCTIVE MATERIAL FOR SECONDARY BATTERY

This is a divisional of application Ser. No. 08/466,197, filed Jun. 6, 1995, now U.S. Pat. No. 5,601,949, which is a continuation-in-part of application Ser. No. 08/134,079, filed Oct. 8, 1993, now abandoned.

BACKGROUND OF THE INVENTION

1. Field of the invention

This invention relates to a secondary battery, and more particularly to an improved ion conductive material for an active material to be used in a secondary battery.

2. Description of the Prior Art

Currently, a negative electrode having carbon compositions for a secondary battery using lithium provides certain advantages. For example, such secondary battery has a higher capacity than a Ni—Cd battery. Although carbon compositions using lithium have superior discharge capacities in comparison to Ni—Cd batteries, this advantage is limited due to the use of +1 lithium ions. Also, such secondary batteries can discharge for a long period on one charging; therefore, they are energy-saving batteries.

However, in order to achieve superior characteristics, a secondary battery having an even higher capacity is needed.

SUMMARY OF THE INVENTION

Accordingly, a primary object of the present invention is to provide a secondary battery with improved battery characteristics, such as improved discharge capacity.

Another object of the present invention is to provide a secondary battery with improved discharge voltage.

In accordance with one specific embodiment of the invention, the above objects are fulfilled by a secondary battery comprising a positive electrode having a material intercalating alkali earth metal ions reversibly, a negative electrode having a carbon composition intercalating alkali earth metal ions reversibly and an electrolyte having an organic solvent and a solute. The solute includes an alkali earth metal salt, for example, $Ba(BF_4)_2$, $Ba(CF_3SO_3)_2$, $Ba(PF_6)_2$, $Ba(ClO_4)_2$, $Ba(AsF_6)_2$, $Ba(SbF_6)_2$, $Sr(BF_4)_2$, $Sr(CF_3SO_3)_2$, $Sr(PF_6)_2$, $Sr(ClO_4)_2$, $Sr(AsF_6)_2$, $Sr(SbF_6)_2$, $Ca(BF_4)_2$, $Ca(CF_3SO_3)_2$, $Ca(PF_6)_2$, $Ca(ClO_4)_2$, $Ca(AsF_6)_2$, $Ca(SbF_6)_2$, $Mg(BF_4)_2$, $Mg(CF_3SO_3)_2$, $Mg(PF_6)_2$, $Mg(ClO_4)_2$, $Mg(AsF_6)_2$ and $Mg(SbF_6)_2$. The material for the positive electrode is selected from $BaNiO_3$, $BaNiO_2$, $BaCoO_3$, $BaCoO_{2.8}$, $BaFeO_3$, $SrNiO_3$, $SrCoO_{2.5}$, $SrCoO_{2.8}$, $SrCoO_3$, $SrFeO_4$, $SrFeO_{2.5}$, $SrFeO_3$, $CaCo_2O_4$, $Ca_3Co_4O_9$, $Ca_2Co_2O_5$, $Ca_3Co_2O_6$, $CaFeO_3$, $CaFeO_2$, $MgNiO_2$, $MgCo_2O_4$ and $MgFe_2O_4$.

In accordance with another specific embodiment of the invention, the above objects are fulfilled by a secondary battery comprising a positive electrode having a material intercalating lanthanoid metal ions reversibly, a negative electrode having a carbon composition intercalating lanthanoid metal ions reversibly and an electrolyte having an organic solvent and a solute. The solute includes a lanthanoid metal salt, for example, $Sm(BF_4)_3$, $Sm(CF_3SO_3)_3$, $Sm(PF_6)_3$, $Sm(ClO_4)_3$, $Sm(AsF_6)_3$, $Sm(SbF_6)_3$, $Eu(BF_4)_3$, $Eu(CF_3SO_3)$, $Eu(PF_6)_3$, $Eu(ClO_4)_3$, $Eu(AsF_6)_3$, $Eu(SbF_6)_3$, $Yb(BF_4)_3$, $Yb(CF_3SO_3)_3$, $Yb(PF_6)_3$, $Yb(ClO_4)_3$, $Yb(AsF_6)_3$, $Yb(SbF_6)_3$, $La(BF_4)_3$, $La(CF_3SO_3)_3$, $La(PF_6)_3$, $La(ClO_4)_3$, $La(AsF_6)_3$ and $La(SbF_6)_3$. The material for the positive electrode is selected from $BaSmNiO_5$, $SmMnO_3$, $Sm_3Fe_5O_{12}$, $BaEu_2NiO_5$, $EuFeO_3$, $EuFe_5O_{12}$, $EuMnO_3$, $EuYbFe_2O_4$, $LaNiO_3$, $La_2CoO_4$, $LaNi_{0.6}Co_{0.4}O_3$, $LaMnO_{4.15}$, $La_4Mn_4O_{11}$, $LaMnO_3$, $LaMn_7O_{12}$ and $LaMnO_{3.15}$.

The above objects are also fulfilled by yet another embodiment of the invention comprising a secondary battery having an average discharge voltage of about 4.0 V and comprising a positive electrode having a material intercalating alkali earth metal ions reversibly, a negative electrode having a carbon composition intercalating alkali earth metal ions reversibly and an electrolyte having an organic solvent and a solute. The solute includes an alkali earth metal salt and is composed of $ClO_4^{2-}$ ions and cations. The material for the positive electrode is selected from $BaFeO_3$, $SrFeO_3$, $CaFeO_3$ and $CaFeO_2$.

In the present invention, the carbon composition for the negative electrode may be selected from coke, refined, coke with 99% or more purity, organic compound produced by calcined cellulose, graphite and glassy carbon. Graphite is one of the more suitable materials for the negative electrode because the amount of intercalating and deintercalating alkali earth metal ions or lanthanoid metal ions is larger. The graphite preferably has an average granule size ranging from 1 μm to 30 μm, a "d" value ($d_{002}$) of a crystal face (002) evaluated by X-ray diffraction ranging from 3.35 to 3.40 and a size of crystallite for a C-axis direction tested by X-ray diffraction larger than 150 Å.

In the secondary battery, the organic solvent may be selected from a group consisting of ethylene carbonate (EC), dimethyl carbonate (DMC) and vinylene carbonate (VC). Preferably, the organic solvent may be composed of a mixture of ethylene carbonate (EC) and dimethyl carbonate (DMC).

In each of the three embodiments described above, i.e. the two embodiments in which the positive electrode has a material that intercalates alkali earth metals reversibly and the embodiment in which the positive electrode has a material that intercalates lanthanoid metal ions reversibly, all of the listed positive electrode materials are the maximum intercalated forms thereof. Compounds in the maximum intercalated form have stable chemical characteristics and are available on the market in that form.

When the positive electrode material has this form, the battery is discharged. During charging, the alkali earth metal ions are deintercalated from the positive electrode and intercalated into the negative electrode.

Although alkali earth metal ions can be introduced into either a positive electrode or a negative electrode, if introduced into a negative electrode made of a carbon compound, destabilization of the negative electrode would occur.

BRIEF DESCRIPTION OF THE DRAWINGS

These and other objects, advantages and features of the invention will become apparent from the following description thereof taken in conjunction with the accompanying drawings which illustrate specific embodiments of the invention. In the drawings.

DETAILED DESCRIPTION OF THE PREFERRED EMBODIMENTS

Figure 1:
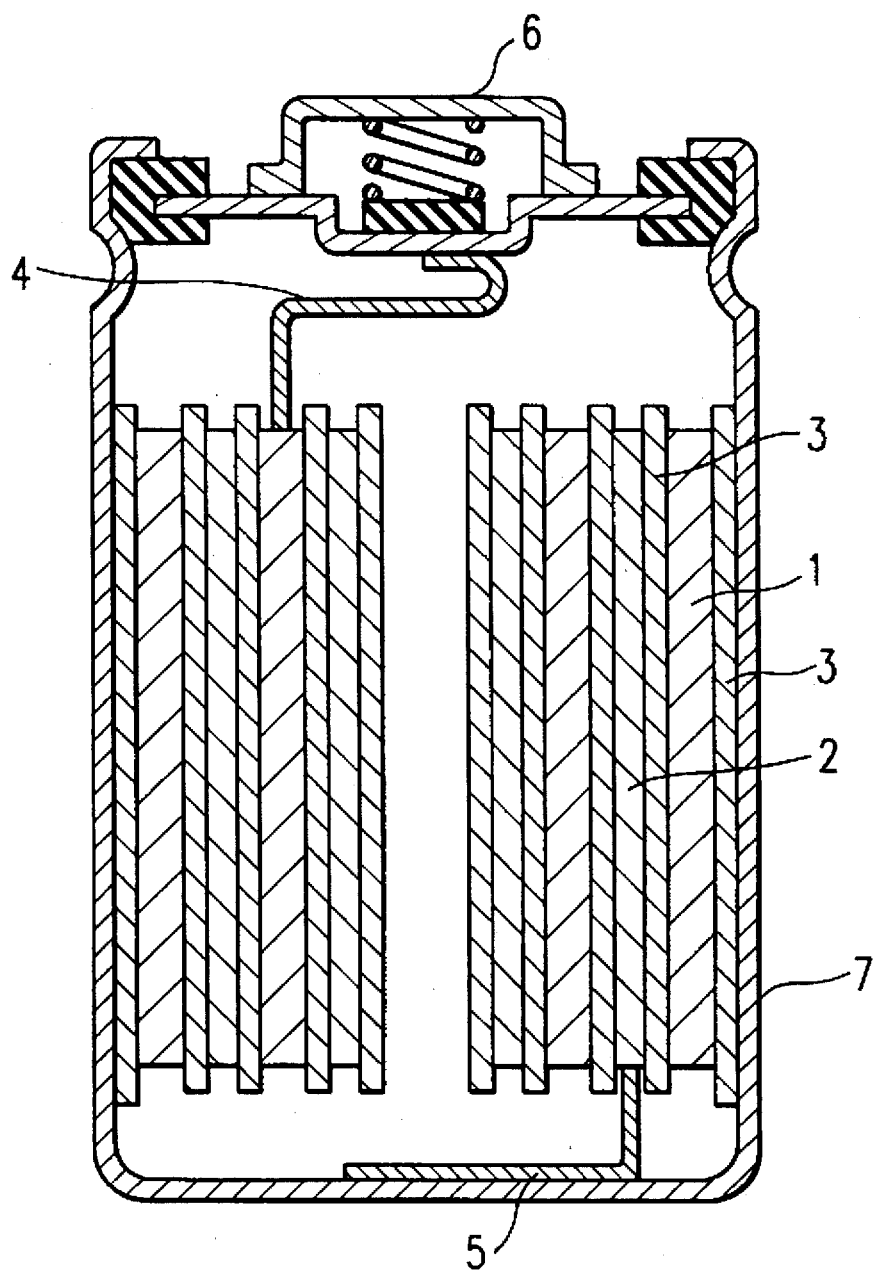
FIG. 1 is a cross-sectional view of a secondary battery in accordance with one exemplary embodiment of the present invention.

The following detailed description is believed to be of the best presently contemplated mode of carrying out the invention. This description is not to be taken in a limiting sense, but is made merely for the purpose of illustrating general principles of the invention. The scope of the invention is best defined by the appended claims.

In the present invention, an ion conductive agent is composed of an alkali earth metal ion ($Ba^2$, $Sr^{2+}$, $Ca^{2+}$, $Mg^{2+}$) or a lanthanoid metal ion ($Eu^{3+}$, $Yb^{3+}$, $Sm^{3+}$, $La^{3+}$ or the like). An ion conductive agent for a secondary battery in accordance with the present invention is used for several reasons: Charge of the alkali earth metal ion or the lanthanoid metal ion is two or three times larger than that of a lithium ion. These cations can transfer two to three times more electricity per one ion in the battery. Therefore, the capacity of the secondary battery using those ions for an ion conductive agent will be two to three times larger than one using lithium.

It is known that alkali earth metal ions are chemically intercalated into carbon compound. However, it has not been known that the alkali earth metal ions are electrochemically intercalated into carbon compounds. This is because an electrolyte having a superior conductivity is required in order to intercalate alkali earth metal ions into carbon compounds. It was thought that no suitable electrolyte was available.

In the present invention, either an alkali earth ion or a lanthanoid metal ion is limited to an ion conductive agent from the group of 2+ charged and 3+ charged metal ions. A reason for the limitation is that the oxidation-reduction potential of both the alkali earth ion and the lanthanoid metal ion is baser than that of other 2+ charged or 3+ charged metal ions. As a result, a battery with higher capacity will be obtained.

The above positive electrode materials may be mixed with a binder, for example, polytetrafluoroethylene (PTFE) and polyvinylidenfluoride (PVdF) and a conductive agent, for example, acetylene black, carbon black and graphite, so as to provide a mixture for the positive electrode.

In one embodiment of the present invention, a carbon composition for a negative electrode which intercalates either alkali earth metal ions or lanthanoid metal ions reversibly may be formed, for example, by coke, preferably, refined coke with the purity of 99% or more, organic compounds produced by calcined cellulose, graphite or glassy carbon. It is appreciated that these carbon compositions have a porous structure. In accordance with one aspect of the invention, they may be used independently, or two or more of them may be mixed together. Graphite may be one of the most suitable materials for the negative electrode, because either alkali earth metal ions or lanthanoid metal ions have both large intercalating and deintercalating capacities as an active material.

More preferably, the graphite would have the following characteristics:

1) an average granule size=1–30 μm,
2) a "d" value ($d_{002}$) of a crystal face (002) evaluated by X-ray diffraction=3.35–3.40,
3) a size of crystallite for a C-axis direction tested by X-ray diffraction=more than 150 Å,
4) a value of specific surface area measured by a BET method=0.5–50 $m^2$/gram, and
5) a value of a real density=1.9–2.3 gram/$cm^3$.

The carbon composition is mixed with a binder, such as for example, polytetrafluoroethylene (PTFE) and polyvinylidenfluoride (PVdF) to obtain a mixture for a negative electrode.

As for a combination of a solute and a positive electrode material, the solute needs to involve a cation composed of either an alkali earth metal or a lanthanoid metal for the positive electrode material. For example, using $BaNiO_3$ for the positive electrode material, $Ba(ClO_4)_2$, $Ba(BF_4)_2$, $Ba(CF_3SO_3)_2$, $Ba(PF_6)_2$, $Ba(AsF_6)_2$ or $Ba(SbF_6)_2$ may be used for the solute because those are composed of $Ba^{2+}$ cations.

In one aspect of the present invention, an electrolyte includes an organic solvent, for example, ethylene carbonate (EC), dimethyl carbonate (DMC) and vinylene carbonate (VC). In accordance with one embodiment of the present invention, a mixture of those solvents may be used. The organic solvent may include vinylene carbonate and its derivatives. The vinylene carbonate derivatives may be obtained by replacing at least one of hydrogen atoms of vinylene carbonate by a methyl group, an ethyl group or one halogen atom. It is noted that an organic solvent used or proposed in a conventional secondary battery for an electrolyte may be applicable. In one embodiment of the present invention, a concentration of the solute in the electrolyte is ranging from 0.7M to 1.5M, preferably 1M.

EXAMPLE 1

{A Secondary Battery "BA1" of the Present Invention}

A method of preparing a positive electrode will first be described. $BaNiO_3$ is mixed with graphite powder as a conductive agent in a weight ratio of 95:5 to obtain a mixture. The mixture is dispersed in a polyimide resin, linear condensated polyimide macromolecules ("TORAY" TORAYNEECE #3000), with N-methyl-2-pyrrolidone (NMP) as a binder solution to obtain slurry. The slurry is kneaded and then coated by Dr. blade method onto one side of a conductive plate of thin aluminum foil to obtain an electrode plate. Then, the electrode plate is then dried at 60° C. under a vacuum condition to evaporate NMP. On the other side of the conductive plate the slurry is coated, and dried in the same way. The polyimide resin is used in 2 parts weight compared to 100 parts weight of the mixture. Last, the plate is heat-treated at a 350° C. temperature for 20 hours to obtain a positive electrode.

A negative electrode may be prepared in the following manner. First, natural graphite powder (a purity of 99% and an average granule size of 12 μm) is mixed with a binder solution to obtain a slurry. Second, the slurry is coated onto a current collector comprising a thin copper plate to obtain an electrode plate. Then, the electrode plate is dried and heated to obtain a graphite layer with a 50 μm thickness. In the negative electrode, the binder is used in 0.5 parts weight in comparison with the natural graphite powder of 100 parts weight.

Ethylene carbonate (EC) and dimethyl carbonate (DMC) are mixed to form an organic solvent mixture. An alkali earth metal salt ($Ba(ClO_4)_2$) is dissolved into the solvent mixture in a concentration of 1 mole/liter to provide a non-aqueous electrolyte. In the electrolyte, a volume ratio of EC to DME is preferably set at 1:1.

As shown in FIG. 1, the battery "BA1" of the present invention has a positive electrode 1 and a negative electrode 2. These electrodes 1 and 2 are separated by a separator 3 impregnated with the non-aqueous electrolyte. The separator 3 is typically formed from an ion permeative porous polypropylene thin film (for example, "Cellgard 3401", made by Hoechst Celanese Co. Ltd.). The positive electrode 1, the negative electrode 2 and the separator 3 are coiled into a roll, and the roll is placed in an outer case 7. The positive electrode 1 is connected to a positive terminal 6 through a lead plate 4. The negative electrode 2 is connected to the outer case 7 through a lead plate 5. The battery "BA1" typically has a cylindrical shape. In a preferred embodiment, the diameter and the height of the battery "BA1" are 14.22 mm and 50 mm, respectively.

EXAMPLES 2–9

{Secondary Batteries "BA2–BA9" of the Present Invention}

All of the elements of batteries "BA2–BA9", except for the positive electrode and solute thereof, are the same as those in battery "BA1". The batteries "BA2–BA9" have positive electrodes and solutes as shown in Table 1. In the batteries "BA1–BA9", each battery has a positive electrode composed of an alkali earth metal oxide as shown in Table 1.

TABLE 1

| Battery | Positive electrode | Solute | Stopping voltage |
|---|---|---|---|
| BA1 | $BaNiO_3$ | $Ba(ClO_4)_2$ | 4.2 V |
| BA2 | $BaCoO_3$ | $Ba(ClO_4)_2$ | 4.2 V |
| BA3 | $BaFeO_3$ | $Ba(ClO_4)_2$ | 4.5 V |
| BA4 | $SrNiO_3$ | $Sr(ClO_4)_2$ | 4.2 V |
| BA5 | $SrCoO_3$ | $Sr(ClO_4)_2$ | 4.2 V |
| BA6 | $SrFeO_3$ | $Sr(ClO_4)_2$ | 4.5 V |
| BA7 | $CaCo_2O_4$ | $Ca(ClO_4)_2$ | 4.5 V |
| BA8 | $CaFeO_3$ | $Ca(ClO_4)_2$ | 4.2 V |
| BA9 | $CaFeO_2$ | $Ca(ClO_4)_2$ | 4.5 V |
| BC1 | $LiCoO_2$ | $LiClO_4$ | 4.2 V |

EXAMPLES 10–25

{Secondary Batteries "BA10–BA25" of the Present Invention}

All of the elements of batteries "BA10–BA25", except for the positive electrode and solute thereof, are the same as those in battery "BA1". The batteries "BA10–BA25" have positive electrodes and solutes as shown in Table 2. In the batteries "BA10–BA25", each battery has a positive electrode composed of an alkali earth metal oxide as shown in Table 2.

TABLE 2

| Battery | Positive electrode | Solute | Stopping voltage |
|---|---|---|---|
| BA10 | $Ba_2SmNiO_5$ | $Sm(ClO_4)_2$ | 3.6 V |
| BA11 | $SmMnO_3$ | $Sm(ClO_4)_2$ | 3.4 V |
| BA12 | $Sm_3Fe_5O_{12}$ | $Sm(ClO_4)_2$ | 3.9 V |
| BA13 | $EuFeO_3$ | $Eu(ClO_4)_2$ | 3.9 V |
| BA14 | $BaEu_2NiO_5$ | $Eu(ClO_4)_2$ | 3.6 V |
| BA15 | $Eu_3Fe_5O_{12}$ | $Eu(ClO_4)_2$ | 3.9 V |
| BA16 | $EuMnO_3$ | $Eu(ClO_4)_2$ | 3.4 V |
| BA17 | $Eu_{0.5}Yb_{0.5}Fe_2O_4$ | $Yb(ClO_4)_2$ | 3.9 V |
| BA18 | $LaNiO_3$ | $La(ClO_4)_2$ | 3.6 V |
| BA19 | $LaNi_{0.6}Co_{0.4}O_3$ | $La(ClO_4)_2$ | 3.6 V |
| BA20 | $La_2CoO_4$ | $La(ClO_4)_2$ | 3.6 V |
| BA21 | $LaMnO_{4.15}$ | $La(ClO_4)_2$ | 3.4 V |
| BA22 | $La_4MnO_{11}$ | $La(ClO_4)_2$ | 3.4 V |
| BA23 | $LaMnO_3$ | $La(ClO_4)_2$ | 3.4 V |
| BA24 | $LaMn_7O_{12}$ | $La(ClO_4)_2$ | 3.4 V |
| BA25 | $LaMnO_{3.15}$ | $La(ClO_4)_2$ | 3.4 V |
| BC1 | $LiCoO_2$ | $LiClO_4$ | 4.2 V |

COMPARATIVE EXAMPLE

All of the elements of battery "BC" used for comparison purpose, except for a positive electrode and a solute thereof, are the same as those in battery "BA1". The battery "BC" has a positive electrode composed of $LiCoO_2$ and a solute composed of $LiClO_4$.

COMPARISON OF CHARGE/DISCHARGE CHARACTERISTICS

Cycle characteristics of the above described batteries "BA1–BA9", "BA10–25" and "BC" were tested. In the tests, the batteries were charged to a charge stopping voltage shown in Tables 1 and 2 at a charging current of 500 mA. The batteries were then discharged to a discharge stopping voltage of 2.0 V at a discharge current of 500 mA to complete 1 cycle. FIG. 2–FIG. 9 show discharge characteristics of the batteries tested. In FIG. 2–FIG. 9, the horizontal axis represents battery capacity (mAh) and the vertical axis represents battery discharge voltage (V). In Table 3 and Table 4, average discharge voltages (V) and capacities (mAh) of the batteries are shown.

TABLE 3

| Battery | Average discharge voltage (V) | Discharge capacity(mah) |
|---|---|---|
| BA1 | 3.7 | 1200 |
| BA2 | 3.7 | 1210 |
| BA3 | 4.0 | 1150 |
| BA4 | 3.7 | 1240 |
| BA5 | 3.7 | 1100 |
| BA6 | 4.0 | 1120 |
| BA7 | 3.7 | 1230 |
| BA8 | 4.0 | 1270 |
| BA9 | 4.0 | 1100 |
| BC | 3.7 | 600 |

TABLE 4

| Battery | Average discharge voltage (V) | Discharge capacity(mAh) |
|---|---|---|
| BA10 | 3.1 | 1800 |
| BA11 | 2.9 | 1810 |
| BA12 | 3.4 | 1850 |
| BA13 | 3.4 | 1840 |
| BA14 | 3.1 | 1700 |
| BA15 | 3.4 | 1720 |
| BA16 | 2.9 | 1830 |
| BA17 | 3.4 | 1870 |
| BA18 | 3.1 | 1700 |
| BA19 | 3.1 | 1880 |
| BA20 | 3.1 | 1815 |
| BA21 | 2.9 | 1805 |
| BA22 | 2.9 | 1810 |
| BA23 | 2.9 | 1820 |
| BA24 | 2.9 | 1835 |
| BA25 | 2.9 | 1830 |
| BC | 3.7 | 600 |

Figure 2:
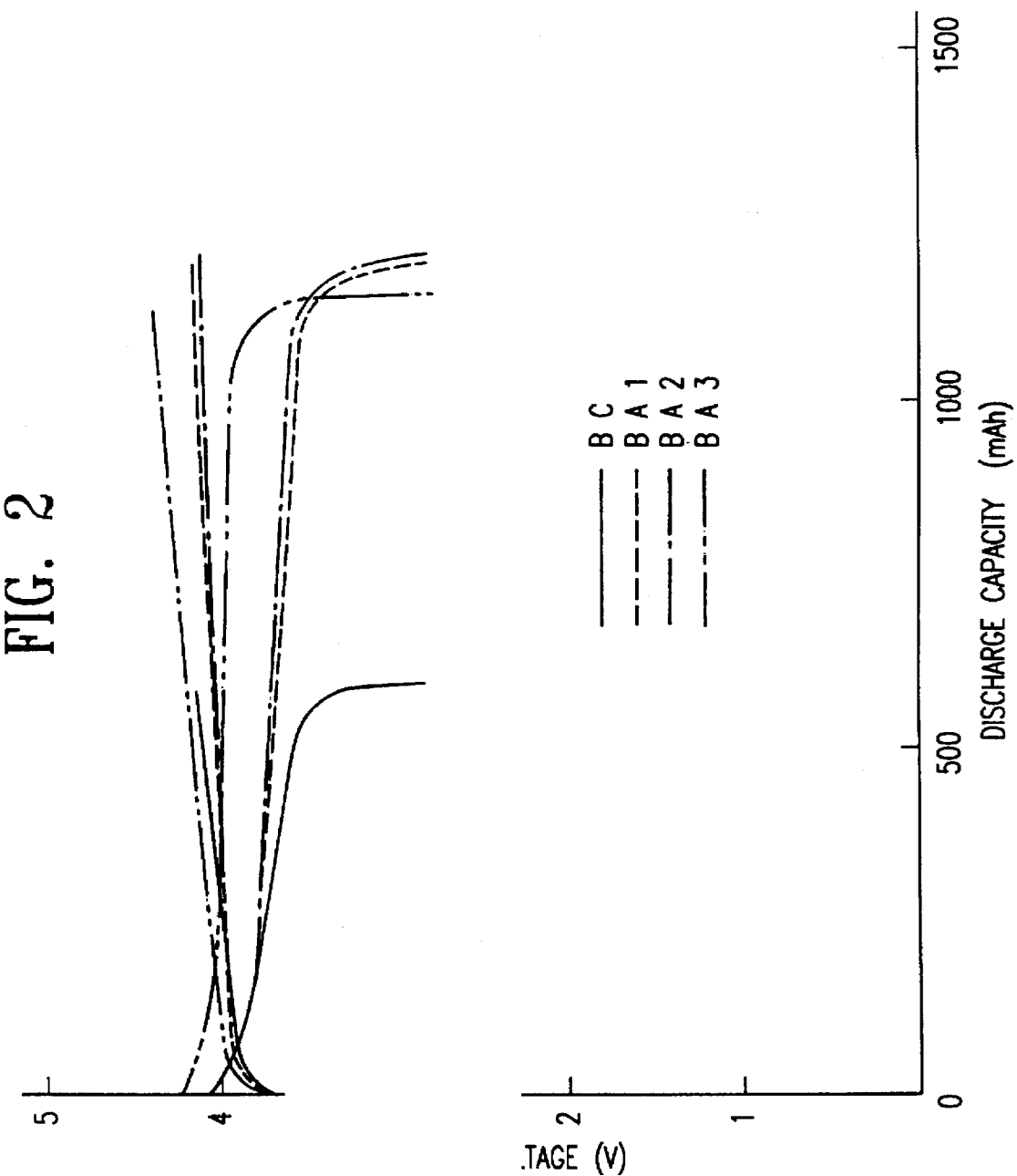
FIG. 2–FIG. 9 are graphs showing the relationship between discharge capacity and battery voltage of various embodiments of the present invention.
Figure 3:
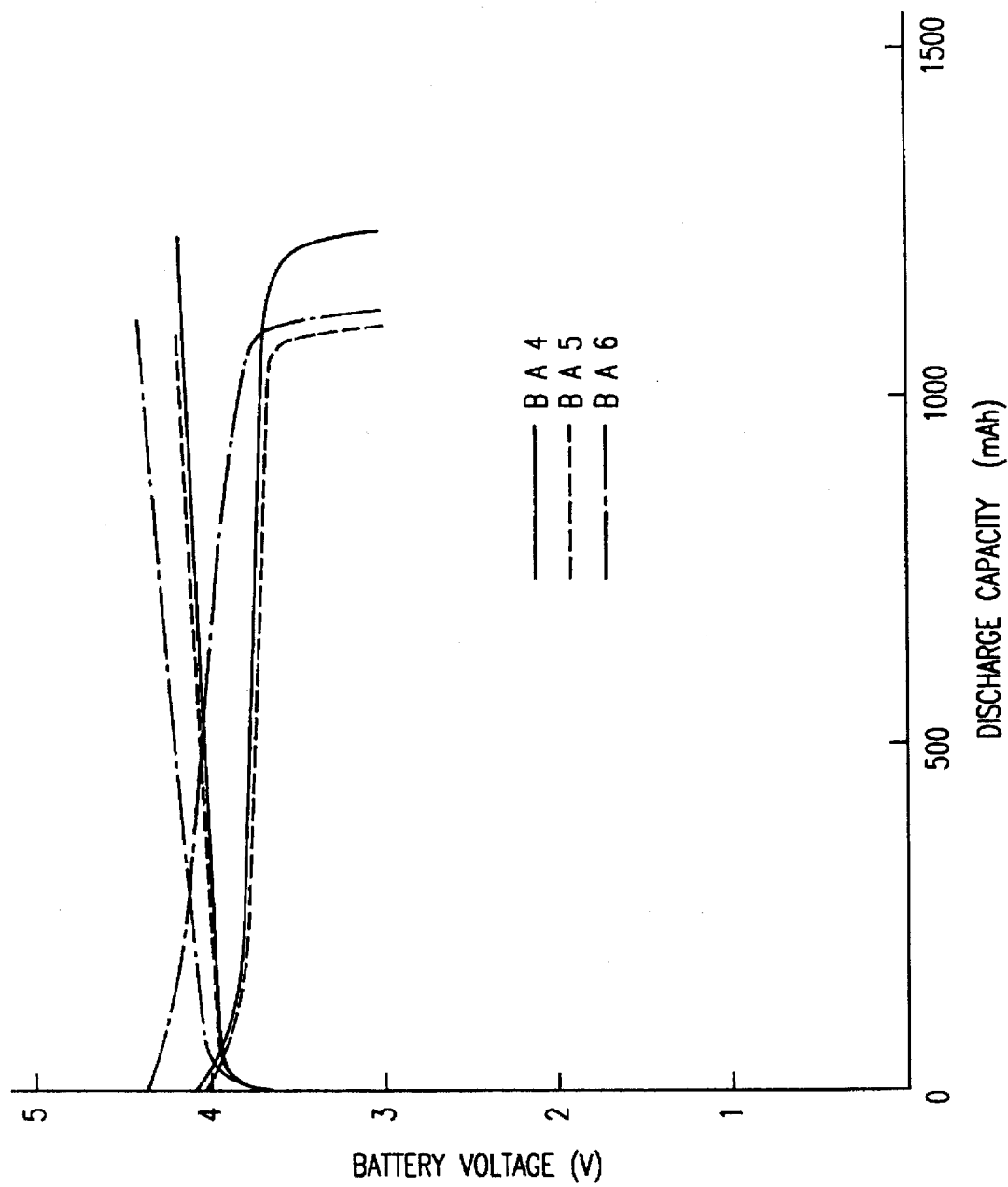
Figure 4:
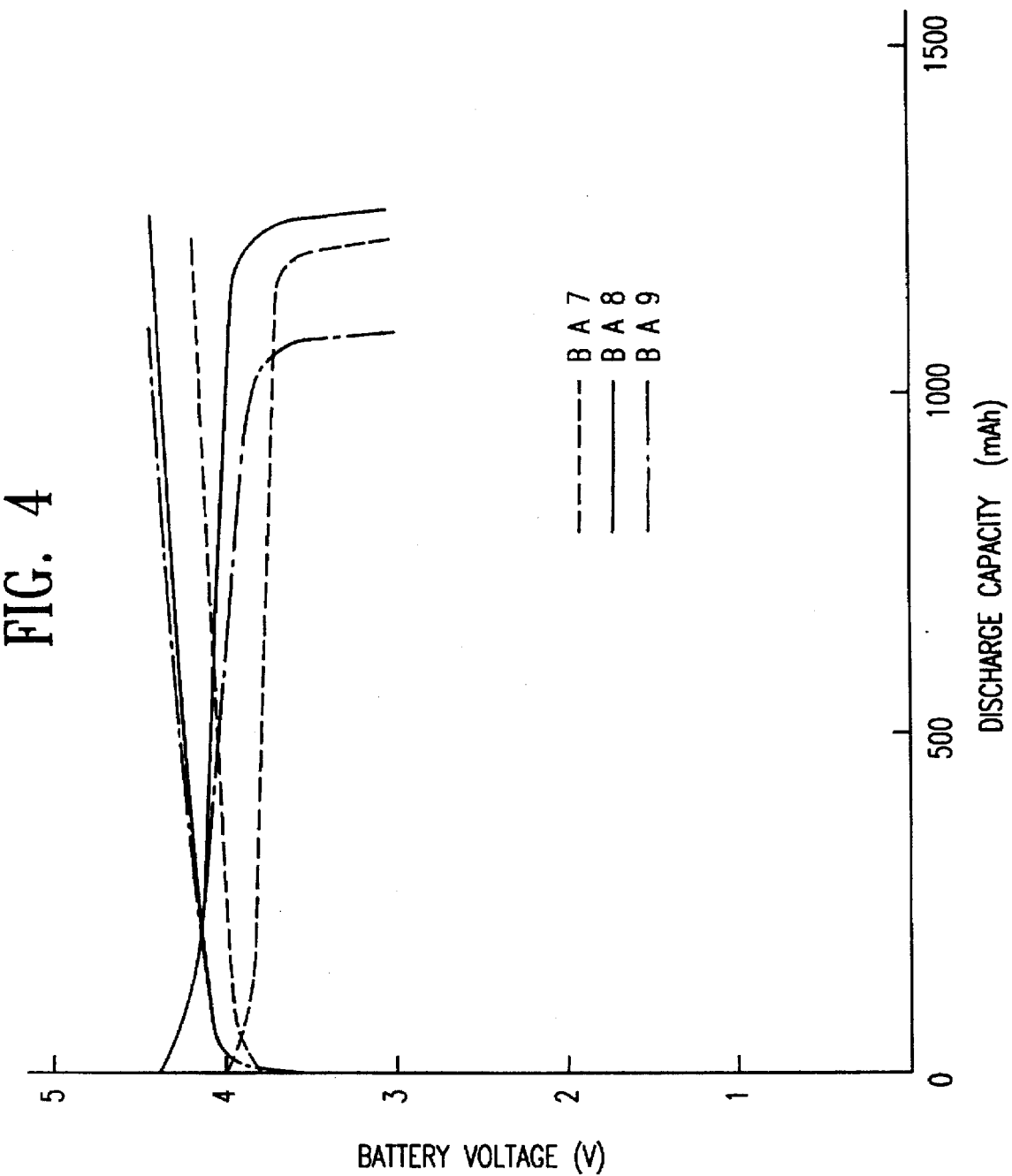
Figure 5:
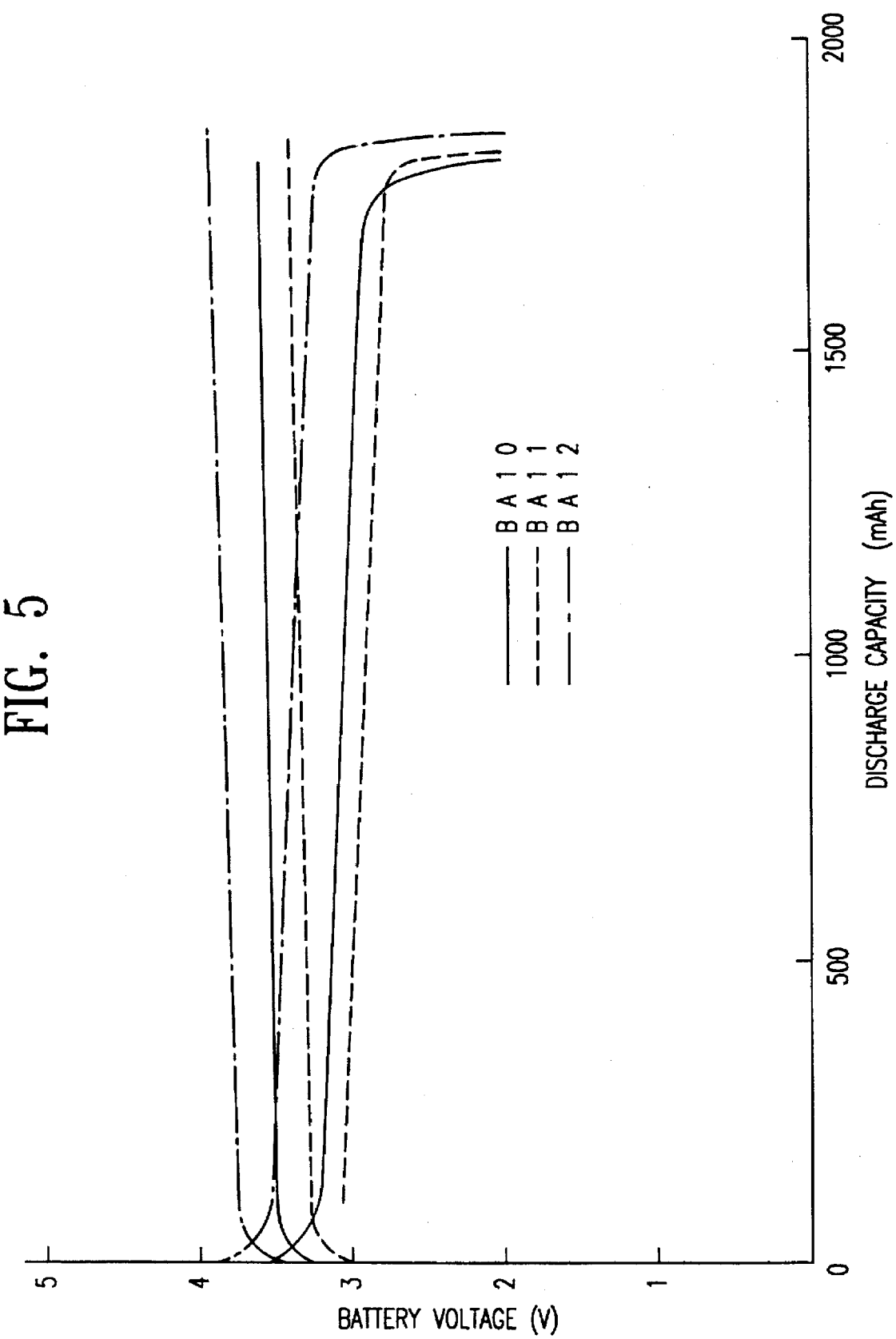
Figure 6:
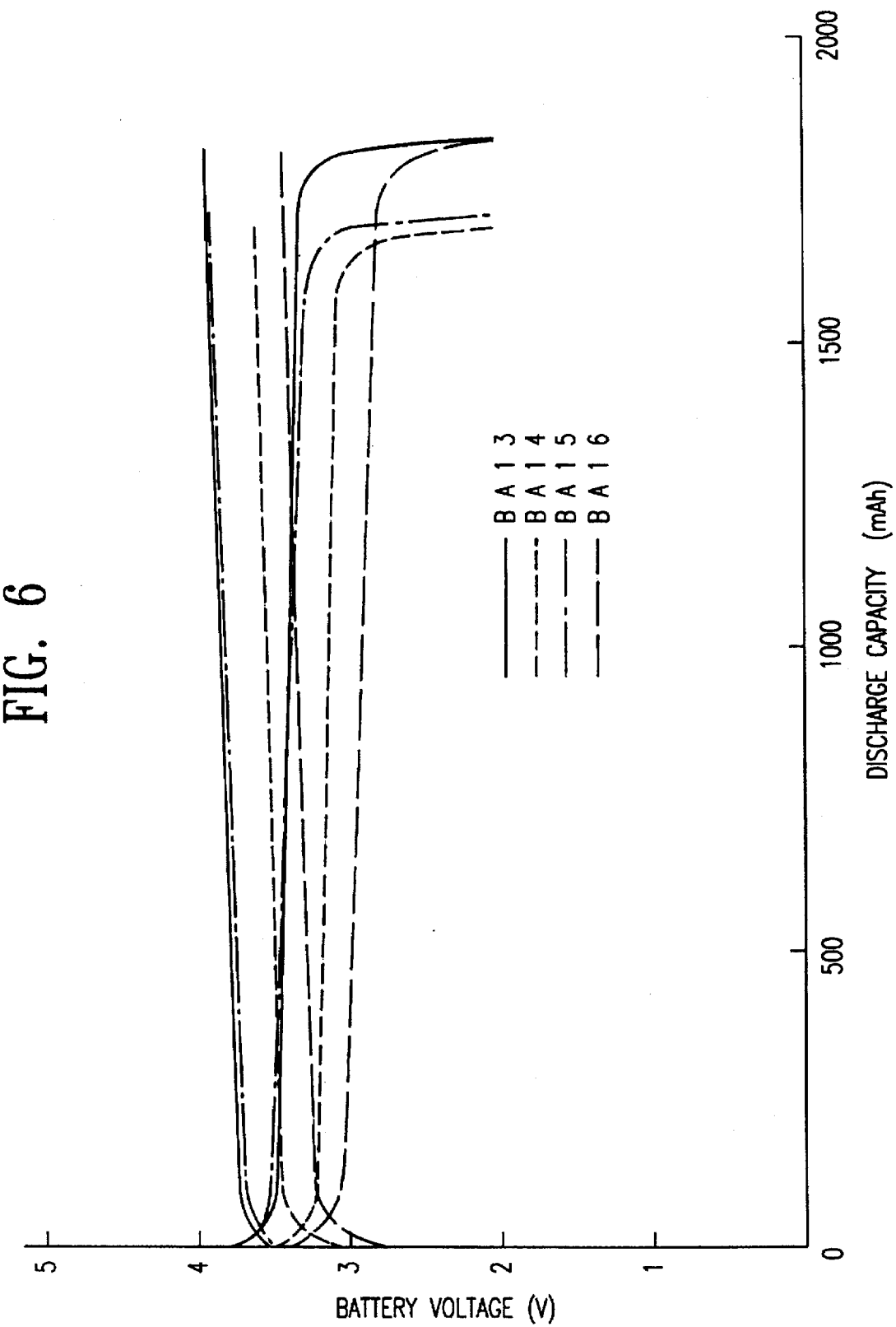
Figure 7:
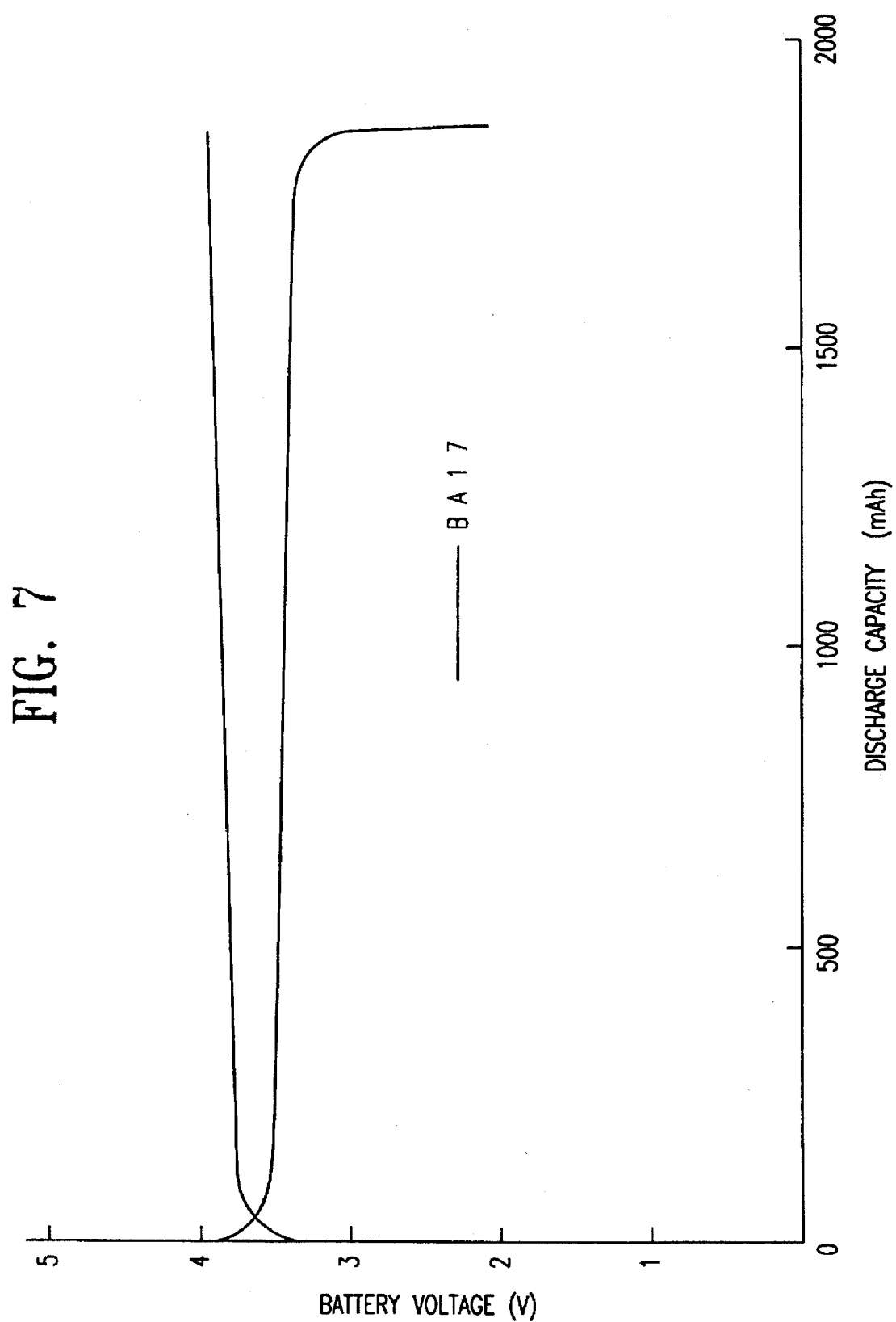
Figure 8:
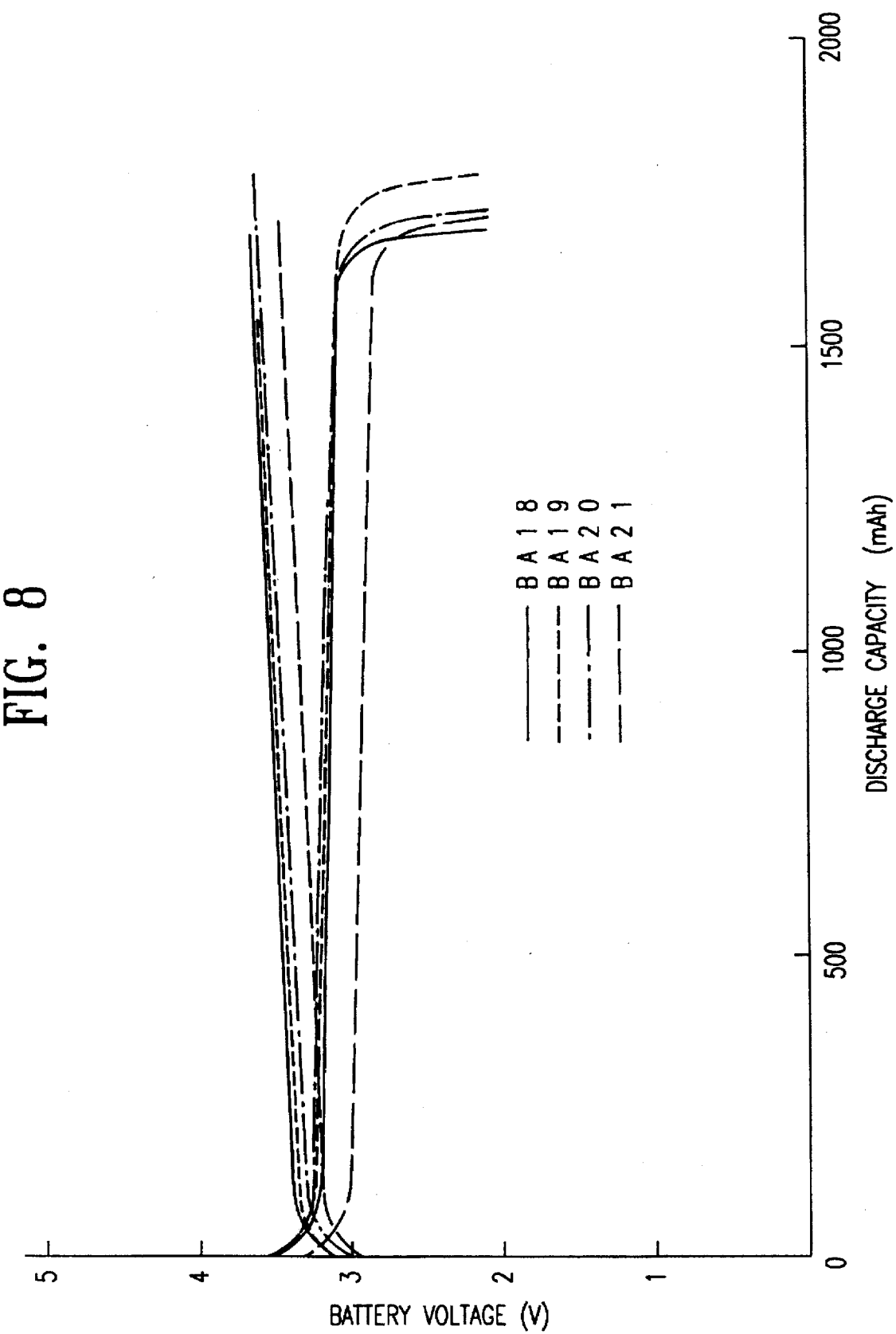
Figure 9:
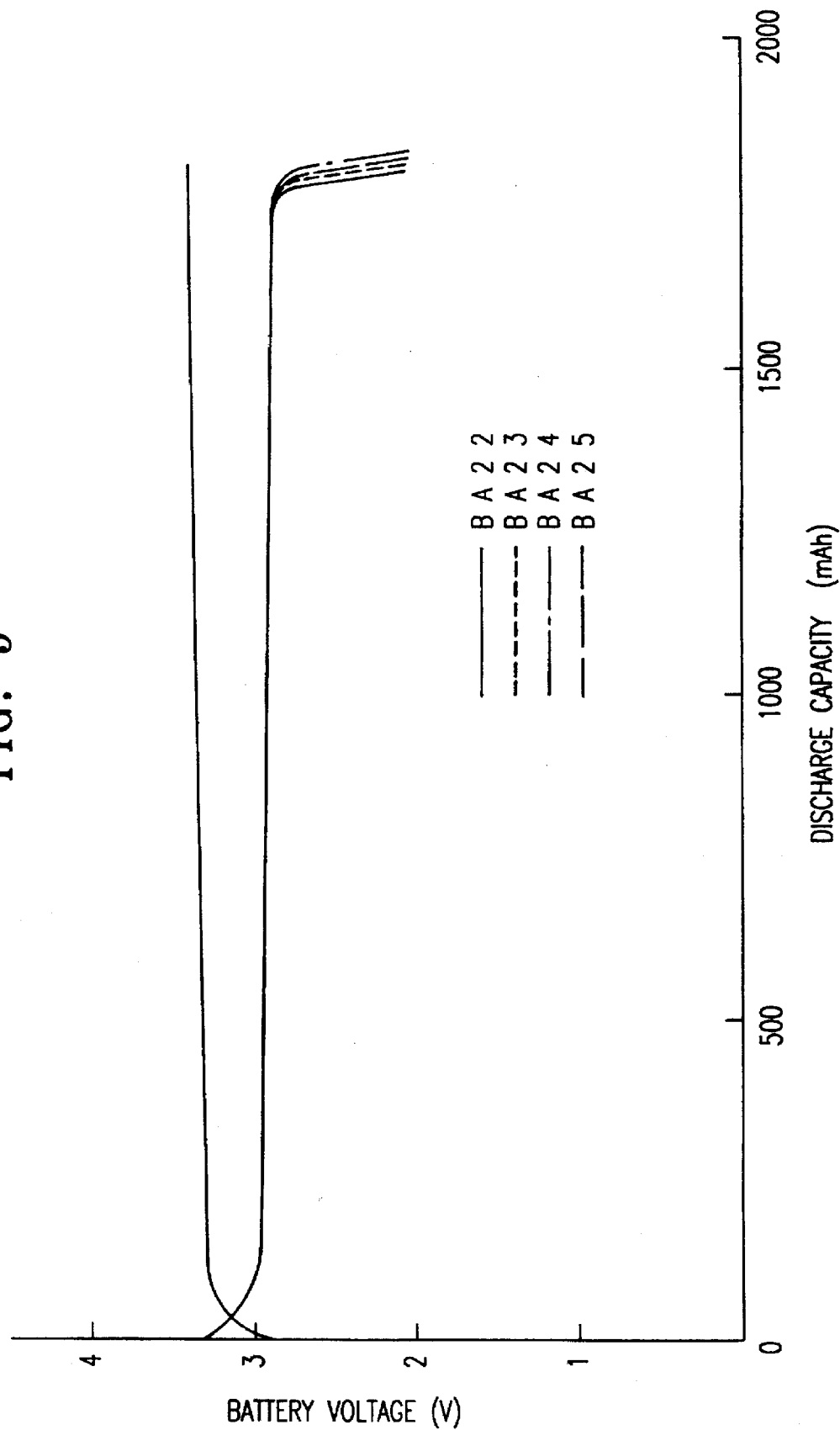

According to FIG. 2–FIG. 4 and Table 3, the batteries "BA1–BA9" using alkali earth metal ions for an ion conductive material have approximately twice the capacity of the battery "BC" used for comparison.

Furthermore, according to FIG. 5–FIG. 9 and Table 4, the batteries "BA10–BA25" using lanthanoid metal ions for an ion conductive material have approximately three times the capacity of the battery "BC".

The "stopping voltage" mentioned herein is the voltage at which the battery is fully charged, i.e. continued application of charging current does not result in any additional charge storage. The value of the stopping voltage of each battery is determined on the basis of principles known in the art.

A battery needs to be fully or essentially charged in order to discharge the ions from a positive electrode material. As the ions are absorbed or intercalated into a negative electrode material, the stopping voltage of the battery depends upon the negative electrode material. Furthermore, the stopping voltage conditions are also dependent upon the combination of positive electrode material, negative electrode material and the solute of ions.

All battery charging/discharging tests described herein were performed at the same temperature, which is necessary to allow valid comparisons. The specific temperature employed to obtain the results described herein was normal room temperature.

All of the batteries described herein, BA1–BA25 and BC, contained the same amount of active material and the same cell volume, as required to permit valid comparisons. Specifically, each of those batteries contains 7 grams of active material.

In the above described embodiments, the batteries have a cylindrical shape. However, it should be appreciated that a coin shaped battery or a flat shaped battery are similarly available.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A secondary battery comprising:

a positive electrode having a material containing reversibly intercalated lanthanoid metal ions, said material being selected from the group consisting of $BaSmNiO_5$, $SmMnO_3$, $Sm_3Fe_5O_{12}$, $BaEu_2NiO_5$, $EuFeO_3$, $EuFe_5O_{12}$, $EuMnO_3$, $EuYbFe_2O_4$, $LaNiO_3$, $La_2CoO_4$, $LaNi_{0.6}Co_{0.4}O_3$, $LaMnO_{4.15}$, $La_4Mn_4O_{11}$, $LaMnO_3$, $LaMn_7O_{12}$ and $LaMnO_{3.15}$;

a negative electrode having a carbon composition intercalating lanthanoid ions reversibly; and an electrolyte having an organic solvent and a solute, said solute including a lanthanoid metal salt.

2. A secondary battery according to claim 1, wherein said solute is selected from the group consisting of $Sm(BF_4)_3$, $Sm(CF_3SO_3)_3$, $Sm(PF_6)_3$, $Sm(ClO_4)_3$, $Sm(AsF_6)_3$, $Sm(SbF_6)_3$, $Eu(BF_4)_3$, $Eu(CF_3SO_3)$, $Eu(PF_6)_3$, $Eu(ClO_4)_3$, $Eu(AsF_6)_3$, $Eu(SbF_6)_3$, $Yb(BF_4)_3$, $Yb(CF_3SO_3)_3$, $Yb(PF_6)_3$, $Yb(ClO_4)_3$, $Yb(AsF_6)_3$, $Yb(SbF_6)_3$, $La(BF_4)_3$, $La(CF_3SO_3)_3$, $La(PF_6)_3$, $La(ClO_4)_3$, $La(AsF_6)_3$ and $La(SbF_6)_3$.

3. A secondary battery according to claim 1, wherein said organic solvent is selected from the group consisting of ethylene carbonate (EC), dimethyl carbonate (DMC) and vinylene carbonate (VC).

4. A secondary battery according to claim 1, wherein said carbon composition is selected from the group consisting of coke, refined coke with $_{99}$% or more purity, organic compound produced from calcined cellulose, graphite and glassy carbon.

* * * * *